US011661049B2

(12) United States Patent
Brown et al.

(10) Patent No.: US 11,661,049 B2
(45) Date of Patent: May 30, 2023

(54) GEARBOX FOR AIR CUSHION VEHICLES

(71) Applicant: AVX Aircraft Company, Benbrook, TX (US)

(72) Inventors: Ian W. Brown, Benbrook, TX (US); Richard F. Murray, Benbrook, TX (US)

(73) Assignee: AVX AIRCRAFT COMPANY, Benbrook, TX (US)

( * ) Notice: Subject to any disclaimer, the term of this patent is extended or adjusted under 35 U.S.C. 154(b) by 156 days.

(21) Appl. No.: 16/895,917

(22) Filed: Jun. 8, 2020

(65) Prior Publication Data

US 2020/0384975 A1    Dec. 10, 2020

Related U.S. Application Data

(60) Provisional application No. 62/858,497, filed on Jun. 7, 2019.

(51) Int. Cl.
| | |
|---|---|
| *B60V 1/14* | (2006.01) |
| *F16H 1/20* | (2006.01) |
| *F16H 57/02* | (2012.01) |
| *F16H 57/023* | (2012.01) |

(52) U.S. Cl.
CPC ............... *B60V 1/14* (2013.01); *F16H 1/20* (2013.01); *F16H 57/02* (2013.01); *F16H 57/023* (2013.01); *F16H 2057/02043* (2013.01); *F16H 2057/02091* (2013.01)

(58) Field of Classification Search
CPC .................. B60V 1/14; F16H 37/065
USPC ...................................... 180/117
See application file for complete search history.

(56) References Cited

U.S. PATENT DOCUMENTS

| | | | |
|---|---|---|---|
| 7,918,146 B2 * | 4/2011 | Gmirya | B64C 27/14 74/665 C |
| 9,377,083 B2 * | 6/2016 | Chung | F16H 37/065 |
| 9,879,768 B2 * | 1/2018 | Kolokythas | F16H 37/065 |
| 10,914,349 B1 * | 2/2021 | Ozawa | F16H 57/0441 |
| 2010/0186549 A1 * | 7/2010 | Ross | F16H 3/006 74/665 D |
| 2022/0032760 A1 * | 2/2022 | Kallner | B60K 6/36 |

FOREIGN PATENT DOCUMENTS

EP    3514274 A1 *   7/2019

* cited by examiner

*Primary Examiner* — Kevin Hurley
*Assistant Examiner* — Hosam Shabara
(74) *Attorney, Agent, or Firm* — Greenberg Traurig, LLP

(57) ABSTRACT

A lightweight gearbox control mechanism for air cushion vehicles provides change in direction of rotation for the vehicle lift fan and allows the gearbox to be used at port or starboard vehicle locations without the use of specialty tools.

6 Claims, 4 Drawing Sheets

GEARBOX FOR AIR CUSHION VEHICLES

STATEMENT REGARDING FEDERALLY SPONSORED RESEARCH

The inventions disclosed herein were made with government support under N68335-18-C-0572 awarded by the Naval AIR WARFARE CTR Aircraft Div. The government has certain rights in the inventions.

CROSS-REFERENCE TO RELATED APPLICATIONS

The present application is a non-provisional of U.S. Provisional Patent Application Ser. No. 62/858,497, titled "Gearbox for Air Cushion Vehicles", filed Jun. 7, 2019, which is incorporated herein as if set out in full.

BACKGROUND

Lightweight gearboxes are used in the propulsion systems for various vehicles, including air cushion vehicles. Traditional gearbox systems for such vehicles do not allow maintenance personnel to select the direction of the lift fan shafting prior to installation or, after installation into the vehicle, without specialized tools. Such gearboxes are also not easily reconfigured to be moved from the port side of the vehicle to the starboard side, or vice versa.

SUMMARY

This Summary is provided to introduce a selection of concepts in a simplified form that are further described below in the Detailed Description. This Summary, and the foregoing Background, is not intended to identify key aspects or essential aspects of the claimed subject matter. Moreover, this Summary is not intended for use as an aid in determining the scope of the claimed subject matter.

A lightweight gearbox control mechanism is presented that may be used in various applications, including air cushion vehicles. Embodiments of the gearbox are manually operated gearbox and allow maintenance personnel to select the direction of the lift fan shafting prior to installation. The present technology permits the gearbox to be moved from a port side of the vehicle to a starboard side of the vehicle, and vice versa, without the use of specialized tools.

Power is delivered to the gearbox through a lift fan drive driveshaft and a propulsor driveshaft. The lift fan section of the gearbox is driven by a combining section through a lift fan interconnect driveshaft. The basic design of the gearbox is functionally identical and functionally interchangeable.

These and other aspects of the present system and method will be apparent after consideration of the Detailed Description and Figures herein. It is to be understood, however, that the scope of the invention shall be determined by the claims as issued and not by whether given subject matter addresses any or all issues noted in the Background or includes any features or aspects recited in this Summary.

DRAWINGS

Non-limiting and non-exhaustive embodiments of the present invention, including the preferred embodiment, are described with reference to the following figures, wherein like reference numerals refer to like parts throughout the various views unless otherwise specified.

DETAILED DESCRIPTION

Embodiments are described more fully below with reference to the accompanying figures, which form a part hereof and show, by way of illustration, specific exemplary embodiments. These embodiments are disclosed in sufficient detail to enable those skilled in the art to practice the invention. However, embodiments may be implemented in many different forms and should not be construed as being limited to the embodiments set forth herein. The following detailed description is, therefore, not to be taken in a limiting sense.

With reference to FIGS. 1-4 a lightweight gearbox control mechanism ("gearbox") is presented that may be used in various applications, including air cushion vehicles. In such applications, the gearbox 10 allows for a change in the direction of rotation for air cushion vehicle lift fans. Various embodiments of lift fan gearbox gear trains of the present technology incorporate a manually operated gearbox 10 that allows maintenance personnel to select the direction of the lift fan shafting prior to installation. Embodiments of the gearbox 10 provide a simple design that permit installation into the vehicle without specialized tools. Such embodiments of the gearbox 10 are capable of being reconfigured to move the gearbox 10 from a port side of the vehicle to a starboard side of the vehicle, and vice versa, without the use of special tools. The gearbox 10 of the present technology is configured to enable shifting or changing the lift fan output speed to improve the ship efficiency.

Figure 1:
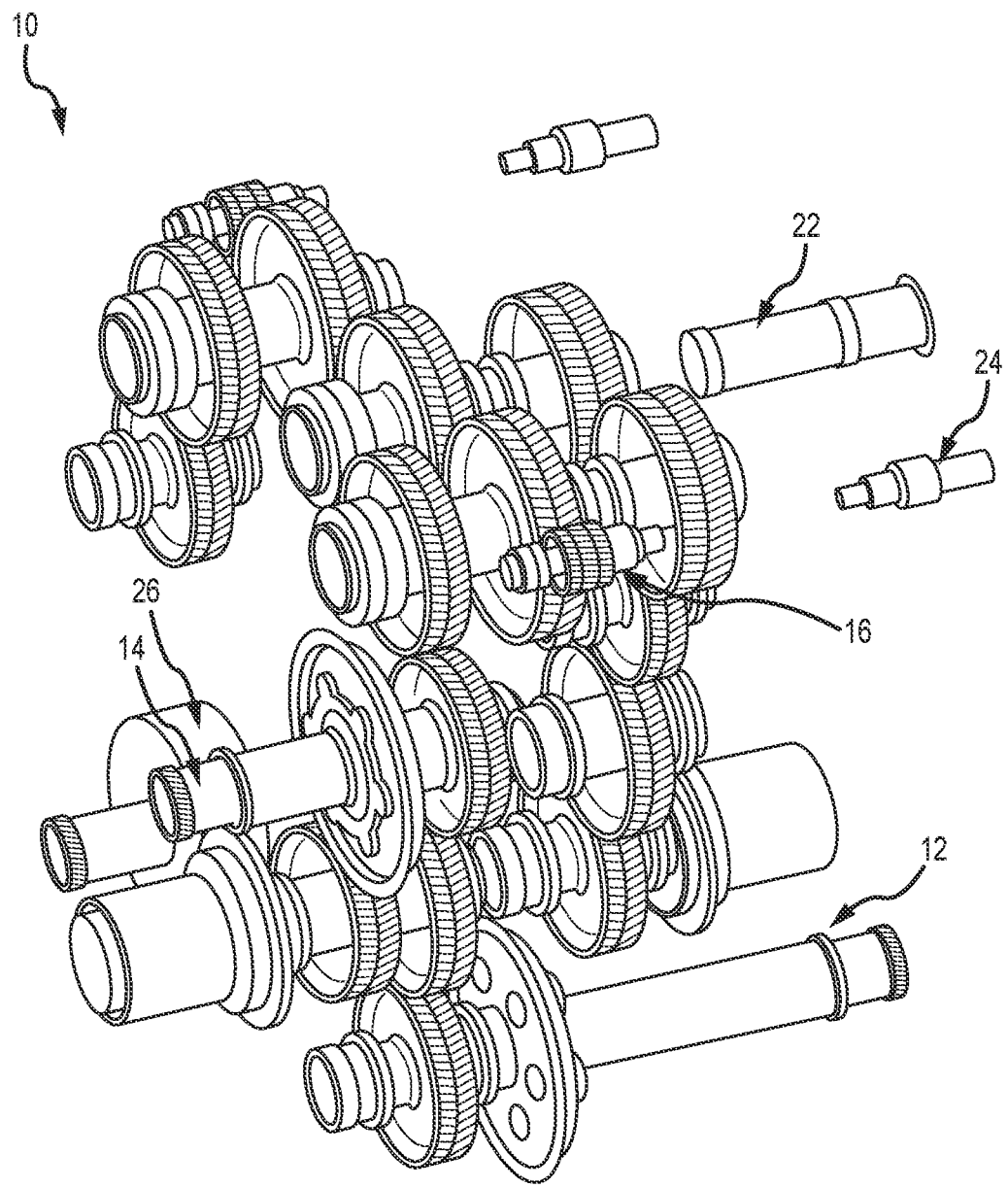
FIG. 1 depicts a typical gearbox gear arrangement of the present technology.

FIG. 1 depicts an overview of one embodiment of a general gear arrangement of the gearbox 10. Power is delivered to the gearbox 10 through a lift fan output driveshaft 12 and a propulsor output driveshaft 14. In particular embodiments, the lift fan output driveshaft 12 is connected to a first stage of the gearbox control mechanism by a single helical combining gear section 16. From the combining gear section 16, power is distributed forward to a double helical lift fan section 18, and aft to the double helical propulsor section 20 of the gearbox.

Figure 2:
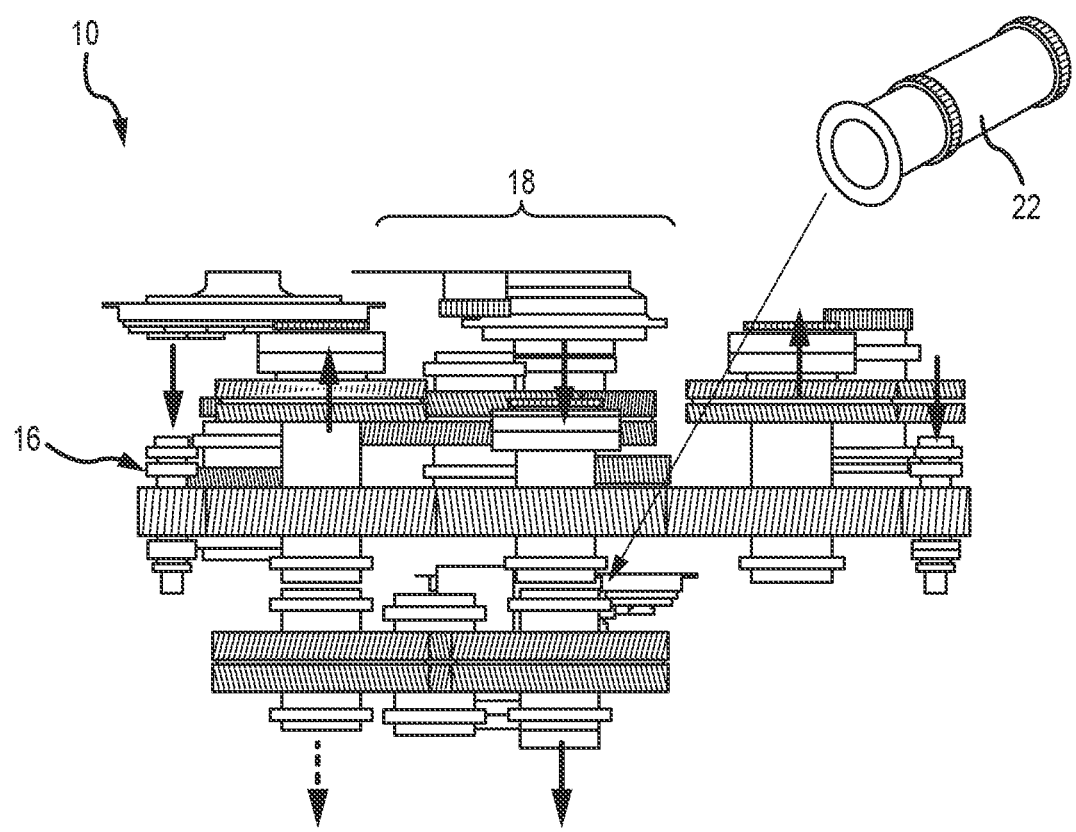
FIG. 2 depicts an overview of one embodiment of a combining section to lift fan section of the present technology.

One embodiment of the gears and components that make up the lift fan section 18 are depicted in FIG. 2. The lift fan section 18 of the gearbox 10 is driven by the combining section 16 through a removable lift fan interconnect driveshaft 22. In various embodiments, the interconnect driveshaft 22 may be installed from the outside of the gearbox 10, without the use of specialized tools.

The direction of rotation of the lift fan is determined, in particular embodiments, by the location that the lift fan interconnect driveshaft 22 is installed, which selects the direction of rotation of a driving gear from the combining section 16. The unused location of the lift fan interconnect driveshaft 22 allows the opposite rotating gear to freewheel and operate unloaded. Alternatively, the lift fan interconnect driveshaft 22 can be removed entirely to completely disengage the lift fan output shaft 12 from the power train. The rotation of each gear is illustrated in FIG. 2 with double arrows, pointed in a direction consistent with the right-hand rule.

Figure 3:
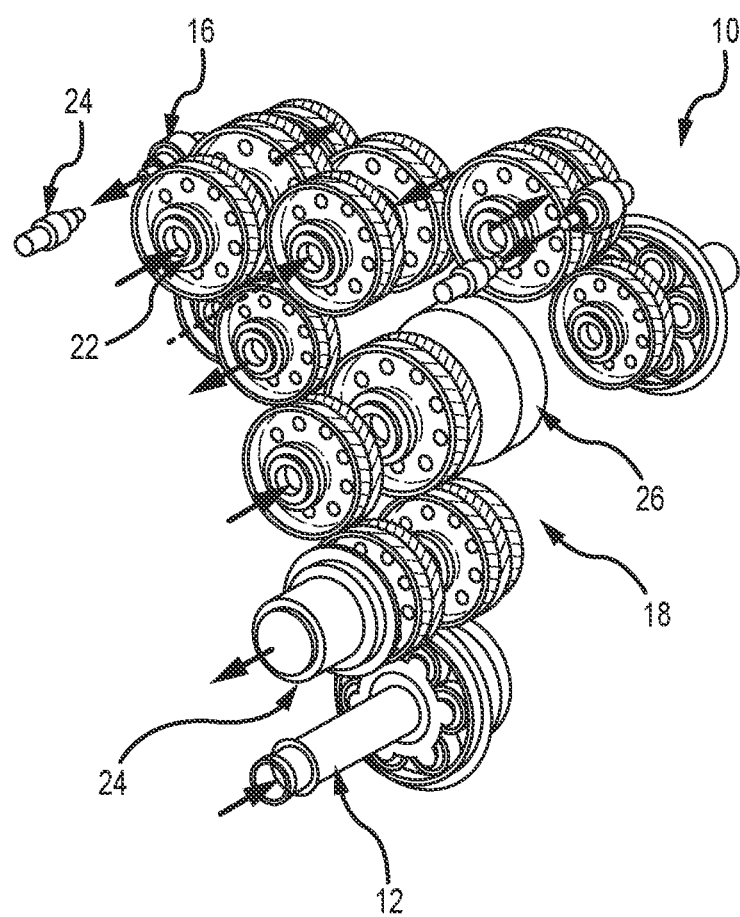
FIG. 3 depicts a lift fan starboard side configuration in accordance with one embodiment of the present technology.

With reference to FIG. 3, a lift fan configuration for a starboard gearbox 10 is depicted. Note the location of the lift fan interconnect driveshaft 22 and overrunning clutch assembly 24. The overrunning clutch assembly 24 and actuated clutch 26 shown in FIG. 3 allow the gearbox 10 two-speed function.

Figure 4:
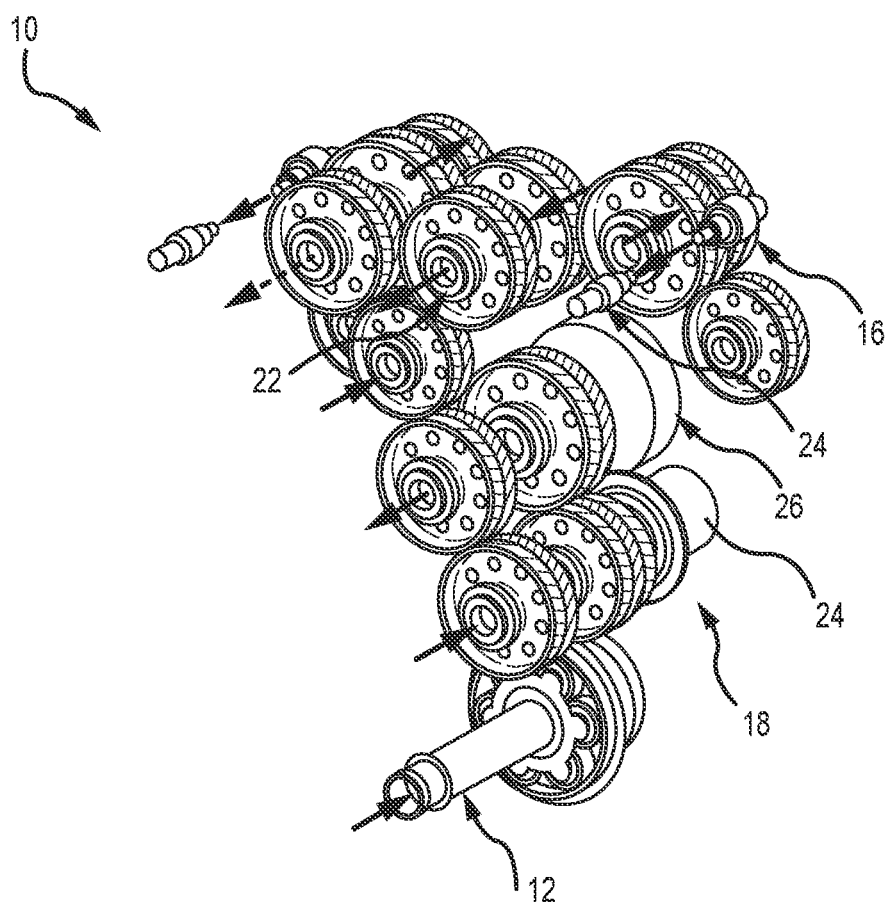
FIG. 4 depicts a lift fan port side configuration in accordance with one embodiment of the present technology.

With reference to FIG. 4, a lift fan configuration for the port gearbox 10 is depicted. Note the location of the lift fan interconnect driveshaft 22. The overrunning clutch assembly 24 is now flipped and installed on the other opposite side of the gearbox 10, to suit the driving direction of rotation of the internal sprag elements.

Because of its basic design, the gearbox 10 is functionally identical and functionally interchangeable. The gearbox 10 is capable of being reconfigured to move it from the port side to the starboard side of the vehicle and vice versa. The remaining elements of the basic gearbox design is not described herein because those of skill in the art will recognize their configuration within the gearbox 10, as depicted in FIGS. 1-4, and focus is directed to the unique gearbox control mechanism, which provides the change in direction of rotation for the lift fan.

Although the technology been described in language that is specific to certain structures, materials, and methodological steps, it is to be understood that the invention defined in the appended claims is not necessarily limited to the specific structures, materials, and/or steps described. Rather, the specific aspects and steps are described as forms of implementing the claimed invention. Since many embodiments of the invention can be practiced without departing from the spirit and scope of the invention, the invention resides in the claims hereinafter appended. Unless otherwise indicated, all numbers or expressions, such as those expressing dimensions, physical characteristics, etc. used in the specification (other than the claims) are understood as modified in all instances by the term "approximately." At the very least, and not as an attempt to limit the application of the doctrine of equivalents to the claims, each numerical parameter recited in the specification or claims which is modified by the term "approximately" should at least be construed in light of the number of recited significant digits and by applying ordinary rounding techniques. Moreover, all ranges disclosed herein are to be understood to encompass and provide support for claims that recite any and all subranges or any and all individual values subsumed therein. For example, a stated range of 1 to 10 should be considered to include and provide support for claims that recite any and all subranges or individual values that are between and/or inclusive of the minimum value of 1 and the maximum value of 10; that is, all subranges beginning with a minimum value of 1 or more and ending with a maximum value of 10 or less (e.g., 5.5 to 10, 2.34 to 3.56, and so forth) or any values from 1 to 10 (e.g., 3, 5.8, 9.9994, and so forth).

What is claimed is:

1. A gearbox for an air cushion vehicle having a lift fan, comprising:
   a lift fan drive driveshaft, operatively coupled to a first stage of the gearbox; the lift fan driveshaft being driven by a combining gear section through a lift fan interconnect driveshaft; and
   a propulsor driveshaft;
   the gearbox being configured to permit the interconnect driveshaft to be installed from the outside of the gearbox.

2. A gearbox for an air cushion vehicle having a lift fan, comprising:
   a lift fan drive driveshaft, operatively coupled to a first stage of the gearbox; the lift fan driveshaft being driven by a combining gear section through a lift fan interconnect driveshaft; and
   a propulsor driveshaft;
   a direction of rotation of the lift fan being determined by an installation location of the lift fan interconnect driveshaft, the installation location further determining a direction of rotation of a driving gear from the combining section.

3. The air cushion vehicle gearbox of claim 1 wherein:
   the lift fan interconnect driveshaft is configured to be removed to disengage the lift fan output shaft.

4. A gearbox for an air cushion vehicle having a lift fan, comprising:
   a lift fan drive driveshaft, operatively coupled to a first stage of the gearbox; the lift fan driveshaft being driven by a combining gear section through a lift fan interconnect driveshaft
   a propulsor driveshaft; and
   an overrunning clutch assembly and actuated clutch are configured to allow the gearbox two-speed function.

5. A gearbox for an air cushion vehicle having a lift fan, comprising:
   a lift fan drive driveshaft, operatively coupled to a first stage of the gearbox; the lift fan driveshaft being driven by a combining gear section through a lift fan interconnect driveshaft
   a propulsor driveshaft; and
   the gearbox is configured to allow the gearbox to be moved between opposite sides of the vehicle for operation of the lift fan.

6. The air cushion vehicle gearbox of claim 1 wherein:
   the lift fan interconnect driveshaft includes an unused portion that allows an opposite rotating gear to freewheel and operate unloaded.

* * * * *